United States Patent [19]
Danapilis et al.

[11] Patent Number: 6,146,002
[45] Date of Patent: Nov. 14, 2000

[54] URETHANE-FREE COMPOSITION USEFUL AS AN ULTRAVIOLET-(UV)-CURABLE BASECOAT AND REFLECTOR USING THE SAME

[75] Inventors: Vince Danapilis, Orland Park; Horace R. Cross, Chicago, both of Ill.

[73] Assignee: Pearl Paints North America, Harvey, Ill.

[21] Appl. No.: 09/000,733

[22] Filed: Dec. 30, 1997

[51] Int. Cl.$^7$ ...................................................... F21V 7/00
[52] U.S. Cl. ........................ 362/346; 362/297; 362/341; 359/884
[58] Field of Search .............................. 313/113; 359/900, 359/884; 427/163.2; 362/296, 135, 346, 341, 348, 297, 347; 428/409, 461

[56] References Cited

U.S. PATENT DOCUMENTS

| | | | |
|---|---|---|---|
| 4,492,718 | 1/1985 | Mayer et al. | 427/160 |
| 4,532,021 | 7/1985 | Murphy et al. | 204/159.16 |
| 4,650,743 | 3/1987 | Galloway | 430/278 |
| 4,814,257 | 3/1989 | Galloway | 430/278 |
| 5,049,321 | 9/1991 | Galic | 264/1.4 |
| 5,136,682 | 8/1992 | Moyer et al. | 385/141 |
| 5,240,817 | 8/1993 | Stout et al. | 430/315 |
| 5,254,395 | 10/1993 | Hodnett, III | 428/217 |
| 5,438,448 | 8/1995 | Nishimura et al. | 359/214 |
| 5,493,483 | 2/1996 | Lake | 362/346 |
| 5,571,570 | 11/1996 | Lake | 427/494 |
| 5,585,415 | 12/1996 | Gorzalski et al. | 522/18 |

OTHER PUBLICATIONS

Flyer, *Ebecryl P36: Copolymerizable Photoinitiator*, UCB Chemicals, Inc. (Smyrna, GA).
Flyer, *Ebecryl 745: Acrylic Oligomer/Monomer Blend*, UCB Chemicals, Inc. (Smryna, GA).
Costanza et al., "Radiation Cured Coatings," Fed. Soc. for Coatings Tech. (Philadelphia, PA: 1986).
Flyer, *Ebecryl 754: Acrylic Oligomer/Monomer Blend*, UCB Chemicals, Inc. (Smyrna, GA).
Flyer, *Ebecryl 767: Acrylic Oligomer/Monomer Blend*, UCB Chemicals, Inc. (Smyrna, GA).
Flyer, *Ebecryl 1701: Acrylated Acrylic Oligomer*, UCB Chemicals, Inc. (Smyrna, GA).
Flyer, *Ebecryl 1701–TP20: Acrylic Oligomer/Monomer Blend*, UCB Chemicals, Inc. (Smyrna, GA).
Flyer, *Ebecryl 1710: Acrylic Oligomer/Monomer Blend*, UCB Chemicals, Inc. (Smyrna, GA).
Flyer, *Ebecryl, 1755: Acrylic Oligomer/Monomer Blend*, UCB Chemicals, Inc. (Smyrna, GA).
Flyer, *Ebecryl, 7100: Acrylated Amine Oligomer*, UCB Chemicals, Inc. (Smyrna, GA).
Flyer, *HDODA Monomer: 1,6–Hexanediol Diacrylate*, UCB Chemicals, Inc. (Smyrna, GA).
Flyer, *Irgacure 184*.
Flyer, *Irgacure 369*.
Flyer, *Irgacure 500*.
Flyer, *Irgacure 651*.

*Primary Examiner*—Sandra O'Shea
*Assistant Examiner*—Ismael Negron
*Attorney, Agent, or Firm*—Welsh & Katz, Ltd.

[57] ABSTRACT

The present invention contemplates a metallized reflector containing an UV-curable basecoat, as well as the basecoat composition itself and a basecoat concentrate composition. The reflector comprises a reflector body formed of a solid matrix having a surface area on which to form a reflective coating and having at least one aperture defined in the surface area for receiving a lamp bulb. An UV-cured basecoat that comprises a cured urethane-free composition of a polyacrylate monomer and a reactive acrylic oligomer is adhered to that surface area. A metal film is adhered to said basecoat to form a reflector surface that is over-coated with a clear, protective layer.

20 Claims, 1 Drawing Sheet

URETHANE-FREE COMPOSITION USEFUL AS AN ULTRAVIOLET-(UV)-CURABLE BASECOAT AND REFLECTOR USING THE SAME

DESCRIPTION

1. Technical Field

This invention relates to an UV-curable basecoat composition and reflector, and more particularly to an ultraviolet-curable basecoat that is free of polymerizable species having a urethane linkage and a metallized reflector product made using the same.

2. Background of the Invention

Ultraviolet (UV)-cured polymeric coatings are generally well-known in the art. Such coatings have been used for basecoats for subsequent application of a reflective metallic coating, as an overcoat for reflective metallic coatings, as solder masks, for forming optical waveguides and the like.

Although these coating systems cure by a similar technique, photoirradiation, and can contain several seemingly similar components, e.g. sensitizers or photoinitiators, ethylenically unsaturated monomers and oligomers, the cured (polymerized) coatings typically exhibit different physical properties that are a function of their end uses. For example, a basecoat for a reflector should be smooth and free of physical defects to enhance reflection and appearance of the product, as well as having good adherent properties for the subsequently applied metallic coating, along with a resistance to heat-caused degradation where a reflector surrounds a lamp. Solder masks also require heat resistance, while exhibiting a lessened need for smoothness.

Lake U.S. Pat. No. 5,493,383 discloses a lamp reflector comprising an UV-cured basecoat comprising an acrylated or methacrylated polyester urethane that can also include an epoxy diacrylate as well as an acrylated or methacrylated polyether urethane. Several oligomeric materials are said to be useful in a composition of the Lake patent, with none having a molecular weight greater than about 2600.

When applied by flow-coating as a basecoat for automotive reflectors, however, compositions prepared as described in the Lake patent have been found to exhibit surface irregularities and defects referred to in the art as "mapping" in which a three-dimensional jagged line resembling a map boundary forms on an otherwise smooth portion of the reflector surface. The presence of such mapping causes reflectors to be rejected by their consumers, with resulting economic loss to the manufacturer and unnecessary waste.

Stout et al. U.S. Pat. No. 5,240,817 teaches the preparation of a photopolymerizable solder mask from a photopolymerizable liquid and film. A disclosed photopolymerizable liquid composition contained primarily tripropyleneglycol diacrylate (TRPGDA) plus sensitizer. When that liquid was diluted with 15–20 weight percent of a mixture of an acrylic oligomer and a blend of diacrylate monomer (Ebecryl® 745) useful herein, and then photopolymerized, the resulting product was noted in the patent to have large voids and cracks. Inasmuch as the goal was to produce defect-free printed circuits, use of the Ebecryl® 745 was counterproductive.

Moyer et al. U.S. Pat. No. 5,136,682 disclose photocurable compositions for forming optical waveguide structures. Example 2 of the Moyer '682 patent compared use of an acrylated aliphatic polyester, a Bisphenol A diepoxide diacrylate and Ebecryl® 745 in making a heat-resistant coating when admixed with various mono- or polyethylenically unsaturated materials such as 1,6-hexanediol diacrylate (HDDA), trimethylolpropane triacrylate (TMPTA), tripropylene glycol diacrylate (TPGDA), triethyleneglycol diacrylate (TEGDA), isobornyl acrylate (IBOA) and the like. An exemplary composition that utilized Ebecryl® 745 along with IBOA was said to have lost over 30 percent of its post cure weight when heated to 250° C. or 320° C., whereas the acrylated aliphatic polyester and acrylated Bisphenol A diepoxide admixed with TMPTA or HDDA lost less than 5 percent of their post cure weights at either temperature. Again, the Ebecryl® 745-containing composition performed poorly, and here did not resist heat-caused degradation.

The properties of enhanced flexibility and adhesion to a substrate that might be achieved in a reflector basecoat by use of an acrylic oligomer have thus not been observed by other workers, and heat-caused degradation of a cured coating containing an acrylic oligomer has been reported to be substantial. In addition, use of an acrylated or methacrylated urethane-containing polymerizable species has also not provided a desired freedom from surface irregularities on UV-curing. The disclosure hereinafter describes a reflector basecoat that on UV-curing provides a reflector body surface that has the enhanced flexibility and adhesion that might be expected from use of a reactive acrylic oligomer and unexpectedly is generally free of surface defects and is not degraded by the temperatures found in light bulb-containing reflectors.

SUMMARY OF THE INVENTION

The present invention contemplates a metallized reflector containing an UV-curable basecoat that is free of urethane linkages as well as the basecoat composition itself.

One aspect of the invention is a reflector that comprises a reflector body formed of a solid matrix having a surface area on which to form a reflective coating and having at least one aperture defined in the surface area for receiving a lamp bulb. An UV-cured basecoat that comprises a cured urethane-free composition of a polyacrylate monomer and a reactive acrylic oligomer is adhered to that surface area. A metal film is adhered to said basecoat to form a reflector surface. The metal reflective film is preferably itself overlaid with a clear, protective topcoat.

The weight ratio of polyacrylate monomer to reactive acrylic oligomer is about 13:1 to about 1:1. In one preferred embodiment, the polyacrylate monomer prior to cure is preferably comprised of a mixture of triacrylate and diacrylate, and the ratio of polyacrylate monomer to reactive acrylic oligomer is about 7:1 to about 1:1. The weight ratio of the triacrylate to the diacrylate in this embodiment prior to cure is preferably about 12:1 to about 2:3. In another preferred embodiment, the polyacrylate monomer prior to cure is a mixture of a triacrylate and tetraacrylate. The weight ratio of triacrylate to tetraacrylate prior to cure is about 2:1 to about 4:5, and the weight ratio of polyacrylate monomer to reactive acrylic oligomer is about 3:1 to about 3:2.

Another aspect of the invention is the basecoat composition itself, prior to cure. That composition is comprised of a polyacrylate monomer and a reactive acrylic oligomer having (i) an average molecular weight of about 20,000 to about 75,000 Da and (ii) an average of about 10 to about 300 reactive ethylenic unsaturations per mole of oligomer. The composition and its components are free of acrylated or methacrylated urethane-containing species, e.g., monomers or oligomers containing one or more urethane linkages and one or more acrylate or methacrylate groups. The composition also contains an UV-cure effective amount of photoinitiator and about 20 to about 55 weight percent of a non-reactive solvent.

In one preferred embodiment, the polyacrylate monomer is a blend of triacrylate and diacrylate monomers that are present at a weight ratio to each other of about 12:1 to about 2:3. In another preferred embodiment, the polyacrylate monomer is a blend of triacrylate and tetraacrylate monomers that are present at a weight ratio of about 2:1 to about 4:5. In particularly preferred practice, as where a basecoat that is particularly insensitive to heat is desired, the reactive acrylic oligomer includes an acrylated acrylic copolymer having an average molecular weight of about 20,000 to about 35,000 Da and an average of about 10 to about 20 reactive ethylenic unsaturations per mole of oligomer.

The present invention has several benefits and advantages. One benefit of the present invention is a composition useful as an UV-cured basecoat for the metallization of plastic reflector products that provides good adhesion along with a deep gloss and a brilliant reflector surface that is free of defects after metallization.

An advantage of the present invention is an UV-cured basecoat that is free of mapping.

Another benefit of the invention is that a cured basecoat is not degraded at temperatures of about 115° to about 235° C.

Still further benefits and advantages will be apparent to the skilled worker from the disclosure that fellows.

BRIEF DESCRIPTION OF THE DRAWINGS

In the drawings forming a portion of this disclosure.

DETAILED DESCRIPTION OF THE INVENTION

The present invention relates to reflectors as are present on automobiles as well as to basecoat compositions useful in preparing such reflectors. A contemplated reflector is adapted to receive a lamp such as a headlight or tail light, and is resistant to degradation that can be caused by the heat generated by such a lamp, e.g., at a temperature of about 115° to about 235° C.

Figure 1:
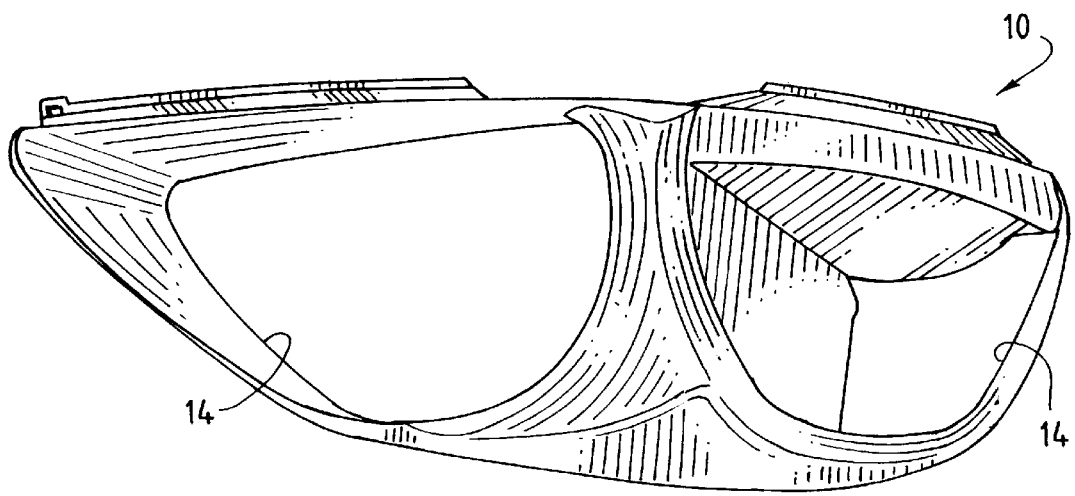
FIG. 1 is an idealized drawing of a contemplated reflector.

A contemplated reflector 10 of FIG. 1 is comprised of a body portion that is formed of a solid matrix 16 and has a surface area 12 on which to form a reflective coating. The reflector body also defines at least one aperture 14 in that surface area that is adapted to receive a lamp bulb (not shown).

The solid matrix 16 that comprises the reflector body can be formed of a number of materials as is well known. Exemplary materials include BMC (a fiberglass-filled polymerized polyester), as well as polybutylene terephthalate (VALOX®), polycarbonate, polyacrylate, polyvinyl chloride, a polyamide such as nylon, ABS (a copolymer of acrylonitrile-butadiene-styrene), various metals such as aluminum and steel.

Figure 2:
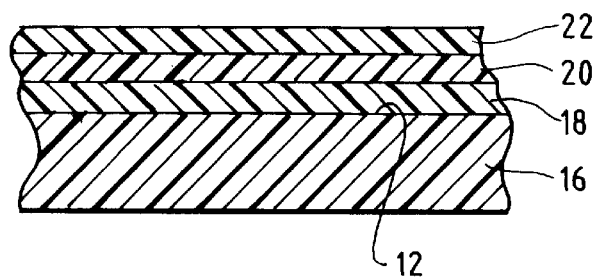
FIG. 2 is an enlarged cross-sectional view of a contemplated reflector.

An ultraviolet light-cured (UV-cured) basecoat 18 (FIG. 2) is adhered to the surface area of the reflector body in the region that ultimately can become a reflective surface. An area greater than that actually covered by the reflective metallic coating 20 can be covered by the basecoat. The basecoat 18 is covered by a reflective metallic coating 20 that is itself covered with a protective topcoat 22. The basecoat, reflective metallic coating and topcoat can be present on both surfaces of the reflector body (not shown).

Once the basecoat is cured, the basecoated surface area 12 of the reflector is itself coated with a reflective film of metal 20 such as aluminum or chromium. Several methods including vacuum metallization, sputtering and the like can deposit the metal film. A contemplated topcoat 22 can be comprised of the same composition as the basecoat 18, whose specific components are discussed hereinafter. The topcoat 22 can also be comprised of another adherent, clear composition as are well known and exemplified in U.S. Pat. No. 4,532,021 and U.S. Pat. No. 5,254,395, whose disclosures are incorporated by reference.

A contemplated basecoat comprises a cured composition of a polyacrylate and a reactive acrylic oligomer. The basecoat and its unpolymerized components are free of urethane and other linkages as discussed below.

Exemplary polyacrylate monomers useful in the pre-cured basecoat composition have a molecular weight of less than about 450 Da, and typically have molecular weights of about 200 to about 350 Da. Those monomers are carbon back-boned esters prepared from a polyol esterified with a plurality of acrylic acid molecules, and include 1,6-hexanediol diacrylate (HDODA), 1,4-butanediol diacrylate (BDODA), trimethylolpropane triacrylate (TMPTA), tripropyleneglycol diacrylate (TRPGDA), diethyleneglycol diacrylate (DEGDA), tetraethyleneglycol diacrylate (TEGDA), pentaerythritol triacrylate, pentaerythritol tetraacrylate, and the like.

In one preferred embodiment a mixture of polyacrylate monomers is used. In one preferred embodiment, that mixture preferably includes a triacrylate and a diacrylate. In addition, the diacrylate is itself preferably present as a mixture of two diacrylates. The particularly preferred triacrylate is trimethylolpropane triacrylate (TMPTA). The particularly preferred diacrylates are 1,6-hexanediol diacrylate (HDODA) and triproplyeneglycol diacrylate (TRPGDA), and those two diacrylates are preferably present in about equal amounts by weight.

Using TMPTA, HDODA, and TRPGDA as exemplary of the triacrylate and two diacrylates, the weight ratio of triacrylate to the diacrylates, e.g., the sum of the individual diacrylates, is about 12:1 to about 2:3, respectively. More preferably, those weight ratios are about 4-8:1 to about 1:1, and most preferably those weight ratios are about 6:1 to about 3:1, respectively. It is to be understood that where monomers having higher or lower molecular weights are utilized, the above weight ratios will vary accordingly.

In another preferred embodiment, another mixture or blend of polyacrylate monomers is used. Here, the polyacrylates are a triacrylate such as TMPTA and a tetraacrylate such as pentaerythritol tetraacrylate. These illustrative monomers are present in the blend at a weight ratio of about 2:1 to about 4:5.

A reactive; i.e., photopolymerizable, acrylic oligomer is also present admixed as part of the composition prior to cure. A contemplated reactive acrylic oligomer has an all carbon backbone that is formed by the polymerization of ethylenic unsaturation of acrylate and other monomers. Such a backbone can be distinguished from those of an acrylated or methacrylated urethane, acrylated polyester, acrylated epoxy or acrylated polyether whose polymeric backbone have an oxygen and nitrogen of the urethane [—OC(O) NH—], an oxygen of the ester [—C(O)O—], or oxygen of the epoxy or ether [—O—]. Thus a contemplated reactive acrylic oligomer is free from acrylated or methacrylated urethane, polyester, epoxy and polyether groups, as is the uncured composition and the cured basecoat composition.

A contemplated reactive acrylic oligomer has an average molecular weight of about 20,000 to about 75,000 Da (about 20 to about 75 kDa). Such an oligomer is free of urethane linkages and ether linkages and acrylated or methacrylated urethane or epoxy groups as discussed above. A contemplated oligomer is itself typically a copolymer of ethylenically unsaturated monomers such as styrene, glutaric acid, maleic acid and acrylic acid esters that has residual acrylic, photopolymerizable unsaturation. A contemplated reactive acrylic oligomer contains an average of about 10 to about 300 reactive ethylenic unsaturations per mole One preferred reactive acrylic oligomer commercially available from UCB Chemicals, Inc. of Smyrna, GA has an average molecular weight of about 67,000 Da and an average of about 3.6 polymerizable ethylenic unsaturations per 1000 grams of oligomer, or an average of about 240 reactive ethylenically unsaturated groups per mole. That acrylic oligomer is admixed at about 54 weight percent polymer solids along with about 23 weight percent HDODA and about 23 weight percent TRPGDA as diluents, and is sold under the name EbecrylO 745. The oligomer/monomer blend as an UV-cured 5 mil film is said by its manufacturer to have a tensile strength of 1900 psi, a tensile elongation of 52 percent and a glass transition temperature of 30° C.

Another useful acrylic oligomer/monomer blend sold under the name Ebecryl® 754 by UCB Chemicals is diluted with about 30 weight percent HDODA. This oligomer/monomer blend, as a 5 mil thick UV-cured film, is said by its manufacturer to have a tensile strength of 360 psi, a tensile elongation of 39 percent, and a glass transition temperature of 22° C.

Another useful reactive acrylic oligomer/monomer blend is available from UCB Chemicals under the name Ebecryl® 1710. This blend contains an acrylic oligomer diluted 60 percent by weight with 1,6-hexanediol diacrylate.

A further reactive acrylic oligomer is also preferably present in the composition where still greater heat tolerance is desired. This reactive acrylic oligomer is also referred to in the art as an acrylated acrylic copolymer has an average molecular weight of about 20,000 to about 35,000 Da, contains an average of about 10 to about 20 ethylenic unsaturations per mole, and is also free of urethane linkages (bonds). An idealized structure for a contemplated reactive acrylated acrylic oligomer that is an acrylated acrylic copolymer is shown in Constanza et al., Radiation Cured Coatings, Brezinski et al., eds., Federation of Societies For Coating Technology, Philadelphia, Pa. (June 1986) at page 9.

A particularly preferred acrylated acrylic copolymer sold under the name Ebecryl® 1701 has an average theoretical molecular weight of about 27,000 Da, and contains an average of about 0.48 reactive ethylenic double bonds per 1000 grams or about 12 to about 14 reactive ethylenic unsaturations per mole of oligomer. This oligomer is reported by its manufacturer, UCB Chemicals, to have a tensile strength of 724 psi, a tensile elongation of 17 percent and a glass transition temperature of 18° C.

A useful blend of a contemplated acrylated acrylic copolymer and a diacrylate is available from UCB Chemicals under the name Ebecryl® 1701-TP20. This blend contains the above acrylated oligomer along with 20 weight percent TRPGDA. As a UV-cured 5 mil film, this blend is said by the manufacturer to exhibit a tensile strength of 1400 psi, a tensile elongation of 24 percent, a Young's modulus of 12000 psi, and a glass transition temperature of −9° C.

The polyacrylate monomer and reactive acrylic oligomer are present broadly in a pre-cured composition at a weight ratio of about 13:1 to about 1:1. More preferably, those components are present at a weight ratio of about 3:1 to about 2.1:1.

The before-discussed reactive acrylic oligomer having a molecular weight of about 67 kDa and an average of about a 240 ethylenic unsaturations per mole is most preferably used at a weight ratio of polyacrylate monomers to oligomer of about 7:1 to about 4:1. The before-discussed reactive acrylic oligomer having an average molecular weight of about 27 kDa and an average of about 12 to about 14 ethylenic unsaturations per mole is most preferably used at a weight ratio of polyacrylate monomers to oligomer of about 3:1 to about 2.1:1.

In one preferred three component composition, the three components of the pre-cured basecoat composition (triacrylate monomer, diacrylate monomer and 67 kDa reactive acrylic oligomer) are present broadly at about 12:1:1 to about 2:3:3. More preferably, those ingredients are present at a weight ratio of about 4- 8:1:1 to about 1:1:1, and most preferably at about 6:1:1 to about 3:1:1.

In another preferred embodiment, a pre-cured basecoat composition contains the triacrylate monomer, diacrylate monomer, and a mixture of the two before-discussed reactive acrylic oligomers (67 kDa and 27 kDa, respectively) in a weight ratio of about 32:3:3:1 to about 2:3:3:1, respectively. More preferably, those weight ratios are about 4-8:1:1:0.25 to about 2:3:3:1, and most preferably, the ratio is about 6:1:1:0.7 to about 3:1:1:0.5, respectively.

Yet another particularly preferred uncured basecoat composition contains a mixture of a triacrylate, a tetraacrylate and reactive acrylic oligomer. Where those ingredients are TMPTA, pentaerythritol tetraacrylate and the before-discussed 27 kDa oligomer, preferred weight ratios of those ingredients are about 2:1:1 to about 1:1.1:1, with the ratio of polyacrylate monomer to reactive acrylic oligomer being about 3:1 to about 2.1:1.

It should be understood that various other combinations of polyacrylate and reactive acrylic oligomer can be used in a contemplated uncured basecoat composition and subsequently photopolymerized. For example, one can utilize a single polyacrylate monomer such as TMPTA or pentaerythritol tetraacrylate and a before-described reactive acrylic oligomer to form the uncured basecoat composition. It is also preferred that the uncured basecoat composition be free of monoethylenically-unsaturtated monomers.

A contemplated basecoat composition is cured by irradiation with UV light by means of a photoinitiator. Photoinitiators are well known in this art. Exemplary photoinitiators include Irgacure® 184 (1-hydroxycyclohexyl phenyl ketone), Irgacure®651 (2,2-dimethoxy- 2-phenyl acetophenone), Irgacure® 500 (1:1 weight ratio of 1-hydroxycyclohexyl phenyl ketone and benzophenone), Irgacure® 369 [2-benzyl-2-N,N-dimethylamino-1-(4-morpholinophenyl)-1-butanone], Irgacure® 1700 (1:3 weight ratio of 2,6-dimethoxy- benzoyl-2,4,4-trimethylpentyl phosphine oxide and 2-hydroxy-2-methyl-1-phenylpropan-1-one), Irgacure® 2959 [4-(2-hydroxyethoxy)phenyl-(2-hydroxy-2-methylpropyl)-ketone], Darocure® 1173 (2-hydroxy-2-methyl-1-phenylpropan-1-one), Darocure® 4265 (1:1 weight ratio of 2,6-dimethoxybenzoyl-2,4,4-trimethylpentyl phosphine oxide and 2-hydroxy-2-methyl-1-phenylpropan-1-one), Ebecryl® P36 (an unsaturated copolymerizable benzophenone derivative), benzophenone, isopropyl thioxanthone, and the like. See also, U.S. Pat. No. 5,240,814 and the citations therein.

A photoinitiator is present in an amount sufficient to cure the composition upon irradiation with UV light (an UV-cure effective amount). A single photoinitiator can be used, but it is preferred to use a mixture of initiators, as is illustrated in the Examples hereinafter. The photoinitiator is typically present in an amount of about 0.5 to about 15 weight percent of the total composition, and more preferably, about 2 to about 10 weight percent of the total composition (i.e., the polymerizable monomer and oligomer, photoinitiator and solvent, as discussed below.) As will be appreciated by those skilled in this art, the reactive acrylic oligomers are themselves quite viscous. For example, the Ebecryl® 745 blend exhibits a viscosity of 15,000–25,000 cps at 25° C., the Ebecryl® 754 blend exhibits a viscosity of 65,000–75,000 cps at 25° C., Ebecryl® 1701 exhibits a viscosity of 9,000–17,000 cps at 65.5° C., and the Ebecryl® 1710 blend exhibits a viscosity of 15,000–30,000 at 25° C. The polyacrylate monomers act to lower the viscosity of the pre-cured composition.

Product sheets from the manufacturer suggest viscosity reduction by use of reactive solvents (diluents) such as mono-, di- and triethylenically-unsaturated monomers to avoid solvent emissions. However, it has been found preferable to utilize non-reactive solvents in these compositions even though the solvents must be removed, because a better basecoat is achieved.

Exemplary useful solvents include alcohols, ketones, aromatic hydrocarbons and esters that are relatively volatile; i.e., the solvent has a boiling point below about 150° C. and preferably below about 130° C., but greater than about 80° C., and preferably greater than about 95° C. Exemplary useful solvents include butyl acetate, sec-butyl acetate, t-butyl acetate, propyl acetate, ethyl propionate, t-butyl propionate, 1-pentanol, 2-pentanol, 3-pentanol, 2-butanol, toluene, ethylbenzene, ortho-, meta- or para-xylene, 2-butanone (methyl ethyl ketone), 2-pentanone, 3-pentanone, and the like.

A contemplated non-reactive solvent can be used alone or a mixture can be used. Small amounts of glycols such as propylene glycol, ethylene glycol or glycol ethers such as ethylene glycol monomethyl ether or propoxy propanol can also be used to retardants of solvent evaporation. The amount of non-reactive solvent present for application to the solid matrix of the reflector body depends upon the specific components of the composition to be cured, the thickness of the cured composition film, the type of substrate used and its surface tension, among other factors.

In typical practice, the non-reactive solvent initially present constitutes about 20 to about 50 weight percent of the total composition, including photoinitiator present for these calculations at about 5 percent. More preferably, the non-reactive solvent constitutes about 35 to about 55 weight percent of the composition as applied to the reflector body. Put differently, a contemplated composition contains about 75 to about 45 weight percent polymerizable solids (polyacrylate monomer plus reactive acrylic oligomer) and more preferably about 60 to about 40 weight percent polymerizable solids. The photoinitiator is not included in the weight of polymerizable solids.

When the composition contains too low a concentration of polymerizable solids, a thin, brittle film results after removal of the solvent and photopolymerization. Contrarily, higher concentrations of polymerizable solids lead to thick, poorly cross-linked films after removal of the solvent and photopolymerization . . .

Although a contemplated basecoat composition contains a non-reactive solvent as discussed above, a basecoat concentrate that is substantially free of solvent; i.e., contains about 5 percent by weight or less non-reactive solvent, is also contemplated. Such concentrates save on shipping costs and also provide economies for the customer who recaptures and reuses the solvent as compared to a product that contains the required amount of solvent. In addition, inasmuch as the non-reactive solvent is typically added in the last part of composition preparation omission of the solvent causes few changes in the preparation of a contemplated composition.

A contemplated basecoat concentrate therefore contains the same relative amounts of the previously recited photoinitiator and copolymerizable ingredients, but lacks a non-reactive solvent. Broadly, then, a contemplated UV-curable reflector basecoat concentrate composition comprises a polyacrylate monomer and reactive acrylic oligomer having (i) a molecular weight of about 20,000 to about 75,000 Da and (ii) an average of about 10 to about 300 reactive ethylenic unsaturations per mole of oligomer. Those ingredients are present at a weight ratio of about 13:1 to about 1:1, respectively, as discussed before. The concentrate also contains an UV-cure effective amount of photoinitiator and is free of acrylated or methacrylated urethane-containing species, as well as similarly substituted polyethers, polyesters and polyepoxides.

The non-reactive solvent is removed from the composition prior to UV-curing. The solvent is preferably removed by passage of the coated reflector body beneath a bank of infrared (IR) lamps with suitable capture of the evaporating solvents. Typical temperature reached beneath the IR lamps are about 55° to about 80° C.

A solvent-containing composition can be applied to a reflector body by one or more of well-known techniques. Exemplary application techniques include dip, spray and flow coating, as well as conventional and electrostatic coating and the like.

Once the solvent is removed from a composition-coated reflector body, the composition is cured by UV irradiation; i.e., light having a wavelength of about 180–400 nm. An exemplary UV source is a mercury vapor lamp manufactured by Fusion Systems Corp., Rockville, Md. that can provide a light dose of about 1600–8000 millijoules per square inch upon the composition from a distance of about 6 to 18 inches. Other similar UV sources are commercially available as is well known, and such alternative light sources can be utilized in place of that described above.

As has been noted previously, a contemplated composition, once freed of its solvent and UV-cured, provides a surface that is free of mapping and other, defects. In addition, the cured basecoat is resistant to heat-cured degradation. For example, a reflector body having a surface-adhered, UV-cured composition contemplated here that contains a polymerized acrylated acrylic oligomer (67 kDa) as the reactive acrylic oligomer exhibited no blistering or other evidence of heat-induced degradation after maintenance in an oven in air at a temperature of about 450° F. (250° C.) for a time period of about 24 hours. Similar UV-cured compositions exhibit a high temperature tolerance and a corresponding freedom from heat-caused degradation at temperatures of about 400° F. (204° C.) to about 450° F. (232° C.) for time periods of about 24 hours. A contemplated UV-cured composition that contains the higher molecular weight reactive acrylic oligomer and no polymerized acrylated acrylic oligomer also exhibits temperature tolerance and a corresponding freedom from heat-caused degradation at temperatures of about 400° F. (204° C.) to about 450° F. (232° C.) for a time period of about 24 hours.

After a contemplated basecoat composition is cured, the cured, basecoat part is placed in a metallizing chamber and a thin film of a metal such as aluminum is applied to the part by standard techniques under reduced pressure. The applied metal film is then itself topcoated with a standard, protective topcoating composition that can be cured by a further UV cure or by a conventional thermal cure. A so-called "in chamber" topcoat can also be applied within the metallizing chamber to protect the metal film.

A contemplated composition is prepared by dissolving the photoinitiator(s) in the monomeric materials under high shear agitation until a homogenous solution is achieved. The reactive acrylic oligomer used in the composition is thereafter admixed with further agitation until a further uniform composition is achieved. The non-reactive solvent is thereafter added and agitated to homogeneity to complete preparation of the composition. Where a before-described basecoat concentrate is desired, the addition of non-reactive solvent is omitted.

Best Mode for Carrying Out the Invention

The Tables that follow provide illustrative basecoat compositions that are contemplated herein. The compositions of formulas B, C, D, E, F H, O, P, and those of Table 4 are particularly useful where greater heat tolerance is desired, whereas the other formulations are particularly useful where high temperature tolerance is not required as where BMC-based reflectors are contemplated.

In a general use, a solvent-containing composition of one of the Tables below was typically flow-coated on to a reflector body. After flow-coating, the reflector body is permitted to drain any excess composition. The solvent was then removed by passage of the uncured basecoated reflector under a bank of infrared (heat lamps) to evaporate the solvent. The solvent-free, uncured basecoated reflector bodies were thereafter irradiated with UV light until the composition was cured. A reflective metal film such as an aluminum film was then layered over the UV-cured basecoat by "vacuum" metallization, followed by an UV-cured topcoat.

More specifically, the compositions illustrated in Table 1–4 were prepared by admixture of the stated amounts of ingredients as discussed hereinabove. Reflector bodies prepared from molded VALOX® [polybutylene terephthalate] were separately flow-coated with the compositions and the solvent removed. The basecoats were UV-cured using UV lights (Fusion Systems, Inc.) that provided 1600–8000 millijoules per square inch to the basecoated-reflector bodies.

TABLE 1

PART 1: Formulations

| RAW MATERIAL | FORMULA | | | | | | |
|---|---|---|---|---|---|---|---|
| | A | B | C | D | E | F | G |
| TMPTA | 36.60 | 36.60 | 36.60 | 33.60 | 36.84 | 50.77 | 36.98 |
| Ebecryl ® 745 | 15.0 | 12.50 | 10.01 | 13.01 | 12.59 | 15.87 | 12.63 |
| Ebecryl ® 1701 | 1.30 | 3.81 | 6.30 | 6.30 | 6.37 | 5.23 | 3.84 |
| Dimethylamino Ethyl Methacrylate | — | — | — | — | — | 0.87 | — |
| Irgacure ® 184 | 3.13 | 3.13 | 3.13 | 3.13 | 2.52 | — | 3.07 |
| Irgacure ® 651 | 0.64 | 0.64 | 0.64 | 0.64 | 0.64 | — | 0.74 |
| Irgacure ® 500 | 0.55 | 0.55 | 0.55 | 0.55 | 0.55 | 4.60 | 0.74 |
| Irgacure ® 369 | 0.06 | 0.06 | 0.06 | 0.06 | 0.06 | 0.04 | — |
| Darocure ® 1173 | — | — | — | — | — | 1.10 | — |
| Butyl Acetate | 42.71 | 42.71 | 42.71 | 42.71 | 40.43 | 18.41 | 35.99 |
| Sec. Butyl Alcohol | — | — | — | — | — | 3.11 | 6.01 |
| TOTAL | 100.00 | 100.00 | 100.00 | 100.00 | 100.00 | 100.00 | 100.00 |

TABLE 2

| RAW MATERIAL | FORMULA | | | | | |
|---|---|---|---|---|---|---|
| | H | I | J | K | L | M |
| TMPTA | 42.00 | 38.00 | 32.00 | 28.00 | 14.47 | 45.90 |
| Ebecryl ® 745 | 7.10 | 11.10 | 17.10 | 21.10 | 29.07 | 18.26 |
| Ebecryl ® 1701 | 3.81 | 3.81 | 3.81 | 3.81 | 5.80 | 6.02 |
| Ebecryl ® 7100 | — | — | — | — | 2.87 | — |
| Irgacure ® 184 | 3.13 | 3.13 | 3.13 | 3.13 | 1.13 | — |
| Irgacure ® 651 | 0.64 | 0.64 | 0.64 | 0.64 | — | — |
| Irgacure ® 500 | 0.55 | 0.55 | 0.55 | 0.55 | 1.73 | 4.29 |
| Irgacure ® 369 | 0.06 | 0.06 | 0.06 | 0.06 | — | 0.05 |
| Ebecryl ® P36 | — | — | — | — | 4.67 | — |
| Darocure ® 1173 | — | — | — | — | — | 0.72 |
| Butyl Acetate | 42.71 | 42.71 | 42.71 | 42.71 | 33.33 | 21.18 |

TABLE 2-continued

| | FORMULA | | | | | |
|---|---|---|---|---|---|---|
| RAW MATERIAL | H | I | J | K | L | M |
| Sec. Butyl Alcohol | — | — | — | — | 6.93 | 3.58 |
| TOTAL | 100.00 | 100.00 | 100.00 | 100.00 | 100.00 | 100.00 |

TABLE 3

| | FORMULA | | | | | | | |
|---|---|---|---|---|---|---|---|---|
| RAW MATERIAL | N | O | P | Q | R | S | T | U |
| TMPTA | 42.33 | 35.45 | 31.75 | 23.81 | 21.16 | 15.87 | 43.07 | 27.58 |
| Ebecryl ® 745 | 10.58 | 17.46 | 21.16 | 29.10 | 31.15 | 37.04 | 25.34 | 29.69 |
| Irgacure ® 184 | 3.13 | 3.13 | 3.13 | 3.13 | 3.13 | 3.13 | — | — |
| Irgacure ® 651 | 0.64 | 0.64 | 0.64 | 0.64 | 0.64 | 0.64 | — | — |
| Irgacure ® 500 | 0.55 | 0.55 | 0.55 | 0.55 | 0.55 | 0.55 | 2.28 | 2.67 |
| Irgacure ® 369 | 0.06 | 0.06 | 0.06 | 0.06 | 0.06 | 0.06 | 0.05 | 0.06 |
| Butyl Acetate | 42.71 | 42.71 | 42.71 | 42.71 | 42.71 | 42.71 | 24.22 | 30.10 |
| Sec. Butyl Alcohol | — | — | — | — | — | — | 5.04 | 9.90 |
| TOTAL | 100.00 | 100.00 | 100.00 | 100.00 | 100.00 | 100.00 | 100.00 | 100.00 |

TABLE 4

| | FORMULA | | | | | | |
|---|---|---|---|---|---|---|---|
| RAW MATERIAL | V | W | X | Y | Z | AA | AB |
| TMPTA | 25.17 | 23.47 | 22.00 | 20.94 | 20.17 | 18.17 | 17.57 |
| pentaerythritol Tetraacrylate | 12.84 | 14.54 | 16.01 | 16.01 | 17.84 | 19.84 | 20.44 |
| Ebecryl ® 1701 | 17.37 | 17.37 | 17.37 | 18.43 | 17.37 | 17.37 | 17.37 |
| Irgacure ® 184 | 3.16 | 3.16 | 3.16 | 3.29 | 3.16 | 3.03 | 3.03 |
| Darocure ® 1173 | 1.46 | 1.46 | 1.46 | 1.33 | 1.46 | 1.59 | 1.59 |
| Sec. Butyl Alcohol | 40.00 | 40.00 | 40.00 | 40.00 | 40.00 | 40.00 | 40.00 |
| TOTAL | 100.00 | 100.00 | 100.00 | 100.00 | 100.00 | 100.00 | 100.00 |

The foregoing description and the examples are intended as illustrative and are not to be taken as limiting. Still other variations within the spirit and scope of this invention are possible and will readily present themselves to those skilled in the art.

We claim:

1. A reflector comprising:
   (a) a reflector body formed of a solid matrix having a surface area on which to form a reflective coating and having at least one aperture defined in said surface area for receiving a lamp bulb;
   (b) a UV-cured basecoat adhered to said surface area that is a composition that comprises a cured polyacrylate monomer and a reactive acrylic oligomer and is free of polymerized acrylated or methacrylated urethane-containing species; and
   (c) a metal film adhered to said basecoat to form a reflector surface.

2. The reflector according to claim 1 wherein the weight ratio of said polyacrylate monomer to said reactive acrylic oligomer is about 13:1 to about 1:1.

3. The reflector according to claim 2 wherein said polyacrylate monomer prior to cure is comprised of a mixture of triacrylate and diacrylate monomers present at a weight ratio of said triacrylate to said two diacrylate monomers of about 12:1 to about 2:3.

4. The reflector according to claim 3 wherein the weight ratio of said triacrylate to said diacrylate prior to cure is about 4-8:1 to about 1:1.

5. The reflector according to claim 2 wherein said polyacrylate monomer prior to cure is comprised of a mixture of triacrylate and tetraacrylate monomers present at a weight ratio of said triacrylate to said tetraacrylate of about 2:1 to about 4:5.

6. The reflector according to claim 1 wherein the weight ratio of said polyacrylate monomer to said reactive acrylic oligomer is about 3:1 to about 2.1:1.

7. A-reflector comprising:
   (a) a reflector body formed of polymerized thermoset resin, polymerized thermoplastic resin or a fiberglass-filled polymerized polyester resin, said reflector body having a surface area on which to form a reflective coating and having at least one aperture defined in said surface area for receiving a lamp bulb;
   (b) an UV-cured basecoat adhered to said surface area that prior to cure comprises a composition of a polyacrylate monomer and a reactive acrylic oligomer present in a weight ratio to each other of about 13:1 to about 1:1, said cured composition being free of polymerized acrylated or methacrylated urethane-containing species; and (c) a metal film adhered to said basecoat to form a reflector surface.

8. The reflector according to claim 7 wherein said polyacrylate monomer of said composition is comprised of a mixture of triacrylate and diacrylate monomers present in a weight ratio relative to said reactive acrylic oligomer of about 12:1:1 to about 2:3:3, respectively.

9. The reflector according to claim 8 wherein said weight ratio is about 4-8:1:1 to about 1:1:1.

10. The reflector according to claim 7 wherein said diacrylate is a mixture of two or more diacrylates.

11. The reflector according to claim 7 wherein said polyacrylate monomer of said composition is comprised of a mixture of triacrylate and tetraacrylate monomers present in a weight ratio relative to said reactive acrylic oligomer of about 2:1:1 to about 1:1.1:1.

12. A UV-curable reflector basecoat concentrate composition that comprises a polyacrylate monomer and a reactive acrylic oligomer that are present at a weight ratio of about 13:1 to about 1:1, said reactive acrylic oligomer having a molecular weight of about 20,000 to about 75,000 Da and (ii) an average of about 10 to about 300 reactive ethylenic unsaturations per mole of oligomer, said concentrate composition also containing a UV-cure effective amount of photoinitiator and being free of acrylated or methacrylated urethane-containing species.

13. The basecoat concentrate composition according to claim 12 wherein said polyacrylate monomer of said composition is comprised of a mixture of triacrylate and diacrylate monomers present in a weight ratio relative to said reactive acrylic oligomer of about 12:1:1 to about 2:3:3, respectively.

14. The basecoat concentrate composition according to claim 13 wherein said diacrylate monomers are a blend of two different diacrylates.

15. The basecoat concentrate composition according to claim 12 wherein said polyacrylate monomer of said composition is comprised of a mixture of triacrylate and tetraacrylate monomers present at a weight ratio of said triacrylate to said tetraacrylate of about 2:1 to about 4:5.

16. The basecoat concentrate composition according to claim 14 wherein the weight ratio of said polyacrylate monomers to said reactive acrylic oligomer is about 3:1 to about 2.1:1.

17. A UV-curable reflector basecoat composition suitable for coating a reflector body that comprises a polyacrylate monomer and a reactive acrylic oligomer that are present at a weight ratio of about 13:1 to about 1:1 as about 75 to about 45 weight percent polymerizable solids dissolved in a non-reactive solvent, said reactive acrylic oligomer having a molecular weight of about 20,000 to about 75,000 Da and (ii) an average of about 10 to about 300 reactive ethylenic unsaturations per mole of oligomer, said composition also containing a UV-cure effective amount of photoinitiator and being free of acrylated or methacrylated urethane-containing species.

18. The basecoat composition according to claim 17 wherein said polyacrylate monomer of said composition is comprised of a mixture of triacrylate and diacrylate monomers present in a weight ratio relative to said reactive acrylic oligomer of about 12:1:1 to about 2:3:3,respectively.

19. The basecoat composition according to claim 17 wherein said polyacrylate monomer prior to cure is comprised of a mixture of triacrylate and tetraacrylate monomers present at a weight ratio of said triacrylate to said tetraacrylate of about 2:1 to about 4:5.

20. The basecoat composition according to claim 19 wherein the weight ratio of said polyacrylate monomers to said reactive acrylic oligomer is about 3:1 to about 2.1:1.

* * * * *